US012124265B2

(12) United States Patent
Tram et al.

(10) Patent No.: US 12,124,265 B2
(45) Date of Patent: Oct. 22, 2024

(54) AUTONOMOUS DECISIONS IN TRAFFIC SITUATIONS WITH PLANNING CONTROL

(71) Applicant: Zenuity AB, Gothenburg (SE)

(72) Inventors: Tommy Tram, Gothenburg (SE); Ivo Batkovic, Gothenburg (SE)

(73) Assignee: Zenuity AB, Gothenburg (SE)

( * ) Notice: Subject to any disclaimer, the term of this patent is extended or adjusted under 35 U.S.C. 154(b) by 518 days.

(21) Appl. No.: 16/847,785

(22) Filed: Apr. 14, 2020

(65) Prior Publication Data

US 2020/0326719 A1    Oct. 15, 2020

(30) Foreign Application Priority Data

Apr. 15, 2019  (EP) ..................................... 19169323

(51) Int. Cl.
*G05D 1/02*    (2020.01)
*G01C 21/34*    (2006.01)
(Continued)

(52) U.S. Cl.
CPC ....... *G05D 1/0221* (2013.01); *G01C 21/3407* (2013.01); *G05D 1/0088* (2013.01); *G06N 20/00* (2019.01)

(58) Field of Classification Search
CPC ............... G05D 1/0221; G05D 1/0088; G05D 2201/0212; G05D 2201/0213; G06N 20/00; G01C 21/3407
See application file for complete search history.

(56) References Cited

U.S. PATENT DOCUMENTS

| 9,248,834 B1 | 2/2016 | Ferguson et al. |
| 9,914,452 B1 | 3/2018 | Ferguson et al. |

(Continued)

FOREIGN PATENT DOCUMENTS

| CN | 107531244 A | 1/2018 |
| CN | 107826104 A | 3/2018 |

(Continued)

OTHER PUBLICATIONS

Extended European Search Report dated Oct. 18, 2019 for European Application No. 19169323.3; 8 pages.

(Continued)

*Primary Examiner* — Jamie Figueroa
*Assistant Examiner* — Jamal A Shah
(74) *Attorney, Agent, or Firm* — Sage Patent Group (57) ABSTRACT

A control device that generates manoeuvring decisions for an ego-vehicle in a traffic scenario is provided. The control device includes a first module including a trained self-learning model, the first module being configured to receive data including information about a surrounding environment of the ego-vehicle determine, using the trained self-learning model, an action to be executed by the ego-vehicle based on the received data. The control device includes a second module configured to receive the determined action, receive data including information about the surrounding environment of the ego-vehicle during a finite time horizon, predict an environmental state for a first time period of the finite time horizon, determine a trajectory for the ego-vehicle based on the received action for the finite time horizon and on the predicted environmental state for the first time period, send a signal in order to control the ego-vehicle according to the determined trajectory.

12 Claims, 4 Drawing Sheets

(51) Int. Cl.
    *G05D 1/00*     (2006.01)
    *G06N 20/00*     (2019.01)

(56) References Cited

U.S. PATENT DOCUMENTS

| | | | |
|---|---|---|---|
| 2018/0089563 | A1 | 3/2018 | Redding et al. |
| 2018/0105186 | A1* | 4/2018 | Motomura ............ G06V 10/82 |
| 2018/0348763 | A1 | 12/2018 | Jiang et al. |
| 2019/0107840 | A1 | 4/2019 | Green et al. |
| 2020/0189574 | A1* | 6/2020 | Vignard ................ G08G 1/166 |

FOREIGN PATENT DOCUMENTS

| | | | |
|---|---|---|---|
| CN | 107924620 | A | 4/2018 |
| CN | 108292134 | A | 7/2018 |
| CN | 108510771 | A | 9/2018 |
| CN | 109213134 | A | 1/2019 |
| DE | 102012017497 | B3 | 12/2013 |
| EP | 3272611 | A1 | 1/2018 |
| JP | 2017200786 | A | 11/2017 |

OTHER PUBLICATIONS

Office Action dated Jul. 10, 2023 for Chinese Patent Application No. 202010295459.4, 10 pages.
Communication pursuant to Article 94(3) EPC mailed Oct. 13, 2023 for European Patent Application No. 19169323.3, 8 pages.

* cited by examiner

AUTONOMOUS DECISIONS IN TRAFFIC SITUATIONS WITH PLANNING CONTROL

CROSS-REFERENCE TO RELATED APPLICATIONS

The present application for patent claims priority to European Patent Office Application Ser. No. 19169323.3, entitled "AUTONOMOUS DECISIONS IN TRAFFIC SITUATIONS WITH PLANNING CONTROL" filed on Apr. 15, 2019, assigned to the assignee hereof, and expressly incorporated herein by reference.

TECHNICAL FIELD OF THE INVENTION

The present disclosure relates to the field of autonomous drive, and more specifically to a solution for safe and comfortable autonomous decisions in traffic situations under uncertainty.

BACKGROUND

Today, many vehicles have a variety of driver support functions in the form of advanced driver assistance systems (ADAS). Also, many of these support functions form a basis for current and future autonomous drive (AD) functions. Examples of ADAS features or functions include lane departure warning systems, lane centering, lane keeping aid, pilot assist, lane change assistance, parking sensors, pedestrian protection systems, blind spot monitors, adaptive cruise control (ACC), anti-lock braking systems, and so forth. These functions supplement the traditional driver control of the vehicle with one or more warnings or automated actions in response to certain scenarios.

The development of autonomous driving vehicles is fast and there are regularly news and demonstrations of impressive technological progress. However, one of the largest challenges with AD is not directly concerned with the autonomous vehicle itself but rather the interaction between the autonomous vehicle and human driven vehicles in mixed traffic situations.

In more detail, human drivers are expected to follow traffic rules strictly, however, they also interact with each other in a way which is not captured by traffic rules. This informal traffic behaviour is important since the traffic rules alone may not always be enough to give the safest behaviour.

Thus, there is a need in the art for new and improved solutions for autonomous vehicles with features that compensate for otherwise typically "human" behaviour that is missing in conventional autonomous drive (AD) solutions, so to increase the road safety in various traffic situations in co-existence with human driven vehicles.

SUMMARY OF THE INVENTION

It is therefore an object of the present disclosure to provide a control device for generating manoeuvring decisions for an ego-vehicle in a traffic scenario, a vehicle comprising such a control device, a method, and a corresponding non-transitory computer-readable storage medium, which alleviates all or at least some of the drawbacks associated with prior known solutions.

This object is achieved by means of a control device, a vehicle comprising such a control device, a method, and a corresponding non-transitory computer-readable storage medium as defined in the appended claims. The term exemplary is in the present context to be understood as serving as an instance, example or illustration.

According to a first aspect of the present disclosure, there is provided control device for generating manoeuvring decisions for an ego-vehicle in a traffic scenario (e.g. crossing one or more intersections, executing a take-over, changing lanes, etc.). The control device comprises a first module comprising a trained self-learning model, and a second module. The first module is configured to receive data comprising information about a surrounding environment of the ego-vehicle, and to determine, by means of the trained self-learning model, an action to be executed by the ego-vehicle based on the received data. The second module is configured to receive the determined action, receive data comprising information about the surrounding environment of the ego-vehicle during a finite time horizon, and predict an environmental state for a first time period of the finite time horizon. Further, the second module is configured to determine a trajectory for the ego-vehicle based on the received action for the finite time horizon and on the predicted environmental state for the first time period, and to send a signal in order to control the ego-vehicle according to the determined trajectory during the first time period.

The presented control device provides a robust and efficient solution for a vehicle to autonomously handle uncertain scenarios by utilizing the synergistic effects of separating the high-level (generating an action) and low-level (generating a trajectory) decision processes into two independent modules. In more detail, the proposed control device utilizes a self-learning model (i.e. artificial neural network) that is trained to identify a current environmental scenario (based on the received data) and output a most suitable action based on rigorous training, i.e. alleviating the need for vehicle-to-vehicle communication to make traffic decisions. The actual computation of the most optimal trajectory is then delegated to a second (different) module (e.g. in the form of a model predictive controller (MPC)) which is configured to generate an optimal trajectory based on received action. The second module is arranged to handle the comfort of the passengers in the vehicle by generating a smooth acceleration curve. By removing the "control part" from the first module and the self-learning model, the risk of having the control device generating new actions while traversing through the "traffic scenario" and thereby generating new acceleration profiles (which may generate jerk and therefore discomfort for the passengers) is reduced. Additionally, by removing the high-level decision making from the second module, the need for calculating every possible trajectory in every traffic scenario is alleviated, thereby reducing the need for immense computational power.

In order to receive data comprising information about the surrounding environment the control device may be in communicative connection (wired or wireless) to perception systems having one or more sensors (e.g. cameras, RADARs, LIDARs, ultrasonic sensors) capable of collecting data representative of a surrounding environment of the vehicle. The perception systems may be internal (i.e. comprised by the ego-vehicle) or external. Moreover, the data may also comprise HD map data. The self-learning model may be any form of suitable trained artificial neural network, such as e.g. a trained machine learning algorithm.

An action is in the present context to be understood as an order for the vehicle (e.g. pass behind car A, but in front of car B, overtake car C, change lane at a specific location, and so forth). A trajectory is to be construed as a time dependent path that the vehicle is to take in order to execute the action. A time period is in the present context to be construed as a sub-portion of or the complete the finite time horizon. For example, if the finite time horizon is ten seconds, the time period may be two seconds, four seconds, or ten seconds. The length of the finite time horizon and the time period can be arbitrarily selected depending on a desired application, or associated specifications.

Further, in accordance with an exemplary embodiment of the present disclosure, the second module is further configured to compare the predicted environmental state with the received information about the surrounding environment of the ego-vehicle during the first time period in order to determine if the determined action is feasible based on at least one predefined criteria, send the signal in order to control the ego-vehicle according to the determined trajectory during the first time period while the determined action is feasible based on the at least one predefined criteria, and send a second signal to the first module, the second signal comprising information about the comparison between the predicted environmental state and the received information about the surrounding environment of the ego-vehicle.

By configuring the second module to also provide a feedback signal (i.e. second signal) to the first module, the decision making process is further improved, and the overall passenger safety can be improved. In more detail, the feedback signal allows the second module to indicate to the "policy making" first module that unexpected environmental changes have rendered the previously receive action unfeasible whereupon the first module can issue a new action or disregard the "warning", depending on how the self-learning model was trained. Naturally, the control device may be overridden by one or more conventional vehicle safety systems (e.g. emergency brake systems) to avoid collisions, however, the feedback signal (i.e. second signal) allows the first module to compensate for modelling errors of the second module, as the "warning" may be a false positive.

Thus, according to another exemplary embodiment of the present invention, the first module is configured to receive the second signal, and determine, by means of the trained self-learning model, the action to be executed by the ego-vehicle further based on the received second signal.

According to a second aspect of the present disclosure, there is provided a vehicle comprising a perception system comprising at least one sensor configured to obtain information about a surrounding environment of the vehicle, and a control device according to any one of the herein disclosed embodiments. The vehicle may further comprise one or more communication arrangements arranged to transmit and receive data to and from a remote server, via an external network (e.g. a cellular network). With this aspect of the disclosure, similar advantages and preferred features are present as in the previously discussed first aspect of the disclosure.

According to a third aspect of the present invention there is provided a method for generating manoeuvring decisions for an ego-vehicle in a traffic scenario. The method comprises, by means of a first module comprising a trained self-learning model: receiving data comprising information about a surrounding environment of the ego-vehicle, determining, by means of the trained self-learning model, an action to be executed by the ego-vehicle based on the received data. The method further comprises, by means of a second module, receiving the determined action from the first module, receiving data comprising information about the surrounding environment of the ego-vehicle during a finite time horizon, predicting an environmental state for a first time period of the finite time horizon, determining a trajectory for the ego-vehicle based on the received action for the finite time horizon and on the predicted environmental state for the first time period, and sending a signal in order to control the ego-vehicle according to the determined trajectory during the first time period. With this aspect of the disclosure, similar advantages and preferred features are present as in the previously discussed first aspect of the disclosure.

According to a fourth aspect of the present invention, there is provided a non-transitory computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Moreover, even if the following description is mainly made in reference to a traffic scenario in the form of two four-way intersection, the skilled reader readily realizes that the teachings herein are readily applicable on other traffic scenarios such as e.g. roundabouts, lane mergers, lane changes, and so forth.

Figure 1:
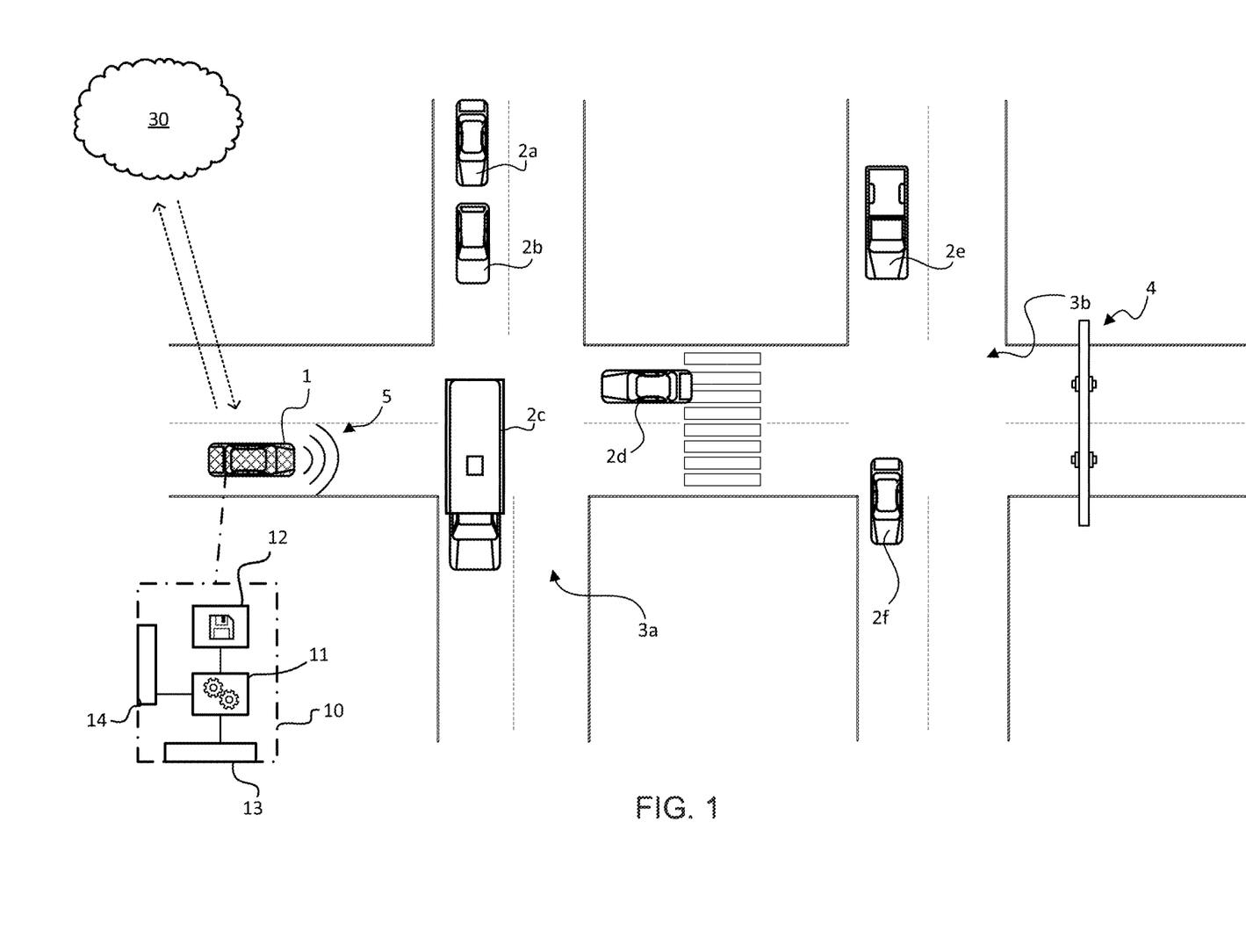
FIG. 1 is a schematic top view illustration of an ego-vehicle in a traffic scenario in accordance with an embodiment of the present disclosure.

FIG. 1 is a schematic top view illustration of an ego-vehicle 1 having a control device 10 for generating manoeuvring decisions for the ego-vehicle 1 in a traffic scenario 3a, 3b associated with a plurality of possible trajectories for the ego-vehicle 1 over a finite time horizon. The traffic scenario is here in the form of two sequential intersections 3a, 3b, through which the ego-vehicle 1 is planned to pass. The control device 10 has one or more processors 11 connected to one or more memories 12, a sensor interface 13, and a communication interface 14.

The control device 10 further has a first module and a second module (see e.g. refs. 21 and 22 in FIG. 2), the modules may for example be parts of the processor 11 (may also be referred to as a control unit, controller, or control circuit). However, each module may also be provided as a separate sub-component (not shown) of the control device 10, each module then comprising at least one memory, at least one sensor interface and/or at least one communication interface. In accordance with an exemplary embodiment the first module comprises a trained self-learning model (e.g. a suitable trained machine learning algorithm such as a trained reinforcement learning algorithm), and the second module is a model predictive controller (MPC). However, in other exemplary embodiments, the second module can be in the form of a sample based tree search controller.

Further, the first module is configured to receive data comprising information about a surrounding environment of the ego-vehicle 1. The data may for example be received from a perception system of the vehicle (as indicated by ref. 5). A perception system is in the present context to be understood as a system responsible for acquiring raw sensor data from on sensors such as cameras, LIDARs and RADARs, ultrasonic sensors, and converting this raw data into scene understanding. However, alternatively or additionally, the first module of the ego-vehicle 1 may receive data comprising information about the surrounding environment (e.g. HD map data) from other sources 30. For example, the data can be received from other vehicles 2a-2f (via a Vehicle-to-Vehicle (V2V) communication protocol), from a remote server 30, and/or from road infrastructure units 4 (telemetric signs, traffic lights, road cameras, tolling systems, etc.) equipped with perception systems.

The ego-vehicle 1 may be connected to external network(s) 30 via for instance a wireless link (e.g. for retrieving map data). The same or some other wireless link may be used to communicate with other vehicles 2a-f in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels. Accordingly, the ego-vehicle 1 may be provided with one or more suitable communication units or other means for communicating with an external entity as known in the art.

Still further, the received data may comprise a current state of the ego-vehicle 1 and a current state of any surrounding vehicles 2a-f relative to the ego-vehicle 1. In more detail, the received data may comprise a pose (position and heading angle) and a speed of the ego-vehicle 1, as well as a pose (position and heading angle) and speed of any surrounding vehicles 2a-f. In more detail, the received data may comprise a number of surrounding vehicles 2a-f, a number of intersections 3a, 3b, a position of an ego-vehicle 1, a position of each surrounding vehicle 2a-f— The received data may further comprise a speed of each surrounding vehicle 2a-f, an acceleration of each surrounding vehicle 2a-f. The received data may further comprise a dimension of each surrounding vehicle 2a-f, a dimension of each intersection 3a, 3b, a distance between each surrounding vehicle 2a-f and a reference point in the surrounding environment, a distance between the ego-vehicle and the reference point in the surrounding environment. The dimension of the intersection may for example comprise a lane width, a number of lanes, and the reference point may for example be a crossing point (i.e. a point in the intersection where the expected paths of the ego-vehicle and the surrounding vehicle 2a-f cross) of the associated/relevant intersection. Moreover, the information about the surrounding environment may further comprise traffic information, such as e.g. traffic rules, traffic light state, etc.

The first module is further configured to determine, using the trained self-learning model, an action to be executed by the ego-vehicle 1 based on the received data. In other words, the first module makes a decision regarding an action based on an environmental state at a given time, and an expected outcome (as predicted by the trained self-learning model). The determined action may for example be to pass in front of a second car 2b at the first intersection 3a, and behind a second car 2e at the second intersection 3b. The self-learning model is preferably trained in order to complete the desired task (in this example to cross the two intersections 3a, 3b) in a safe, comfortable and efficient manner Other actions may for example be to drive before all vehicles 2a-f approaching the intersection 3a, 3b, or to stop at the next intersection 3a, 3b.

Thus, the first module considers both observational data (information about the surrounding environment) and "behavioural data", i.e. behavioural patterns and expected events in a given situation based on "experience". In other words, the first module does not merely rely on a current state of the environment, but also includes one or more hypotheses of how a current situation is expected to evolve (e.g. that some vehicles will slow down to a certain speed when approaching the intersection).

Further, the control device 10 has a second module (see e.g. ref. 22 in FIG. 2) configured to receive the determined action (or a signal/data comprising information about the determined action) from the first module. The second module is further configured to receive data comprising information about the surrounding environment 1 of the ego-vehicle during the finite time horizon. The received data is then used as a basis for predicting an environmental state for at least a first time period of the finite time horizon. A time period may for example be sub-portion of the finite time horizon or the whole finite time horizon.

As previously discussed, the received data comprises a current pose (position and heading angle) and a speed of the ego-vehicle, as well as a pose (position and heading angle)

and speed of any surrounding vehicles 2a-f. The predicted environmental state may for example comprise a predicted state of the ego-vehicle 1 and a predicted state of any surrounding vehicles 2a-f relative to a reference point (e.g. relative to the ego-vehicle) for the duration of the time period. A vehicle state may for example comprise a pose of the vehicle, a speed of the vehicle, a dimension of the vehicle, and if applicable a distance between the vehicle and one or more reference points. Moreover, the second module is configured to determine a trajectory for the ego-vehicle for the finite time horizon based on the received action and on the predicted environmental state for the first time period. A trajectory is in the present context to be understood as a time dependent vehicle path, i.e. a path in which the pose (i.e. position and heading) of the ego-vehicle is defined for a plurality of points in time along the path.

According to an exemplary embodiment, the second module is configured to determine a trajectory for the ego-vehicle 1 to execute the determined action, such that the determined trajectory is optimized with respect to a predefined function. The predefined function may for example be a quadratic function, a non-linear function, or any other suitable function as readily understood by the skilled artisan.

Once, a trajectory has been set or determined by the second module, the second module is configured to send a signal (e.g. acceleration request) in order to navigate/control the ego-vehicle 1 according to the determined trajectory during the first time period. Thus, in accordance with an illustrative example, the determined action may be to pass behind the truck 2c through the first intersection 3a and then to pass behind the pickup truck 2e at the second intersection 3b. The second module will then generate the most optimal trajectory in order to execute the determined action. In more detail, the trajectory can be optimized with respect to a predefined function (typically a quadratic function), which is defined to ensure a comfortable and safe but time efficient passage through the intersection as given by the determined action.

The decision making process for the trained self-learning model in the first module can be modelled as a Partially Observable Markov Decision Process (POMDP). A POMPDP is defined by the seven-tuple ($\mathcal{S}, \mathcal{A}, \mathcal{T}, \mathcal{R}, \Omega, \mathcal{O}, \gamma$), where $\mathcal{S}$ is a state space, $\mathcal{A}$ is an action space, $\mathcal{T}$ is the transmission function, $\mathcal{T}$ is the reward function $\mathcal{T}: \mathcal{S} \times \mathcal{A} \rightarrow \mathbb{R}$, $\Omega$ is the observation space, $\mathcal{O}$ is the probability of being in state $s_t$ given the observation $o_t$, and $\gamma$ is the discount factor. At each time instant, an action $a_t \in \mathcal{A}$, is taken, which will change the environment state $s_t$ to a new state vector $s_{t+1}$. Each transition to $s_t$ with action $a_t$ has a reward $r_t$ given by a reward function $\mathcal{T}_r$. A difference from a regular Markov Decision Process (MPD) is that the environment state $s_t$ is not entirely observable.

If the self-learning model is in the form of a trained reinforcement learning algorithm, then training can be realized as deep Q-learning. In more detail, reinforcement learning is when an agent/a model observes the state $s_t$ of the environment, takes an action $a_t$ and receives a reward $r_t$ at every time step t. Through "experience" the agent updates a policy π in a way that maximizes the accumulated reward $\mathcal{T}$ in order to find the optimal policy π*. The optimal policy is given by a state action value function $Q(s_t, a_t)$. The optimal policy is given by the action that gives the highest Q-value.

$$\pi^*(s_t) = \arg\max_{a_t} Q^*(s_t, a_t) \quad (1)$$

Following the bellman equation the optimal Q-function $Q^*(s_t, a_t)$ is given by:

$$Q^*(s_t, a_t) = \mathbb{E}[r_t + \gamma \max_{a_{t+1}} Q^*(s_{t+1}, a_{t+1}) | s_t, a_t] \quad (2)$$

because Q-learning is a model-free algorithm and does not make any assumptions on the environment even though models are used to simulate the environment. This can be useful when the outcome does not match the prediction models.

Figure 2:
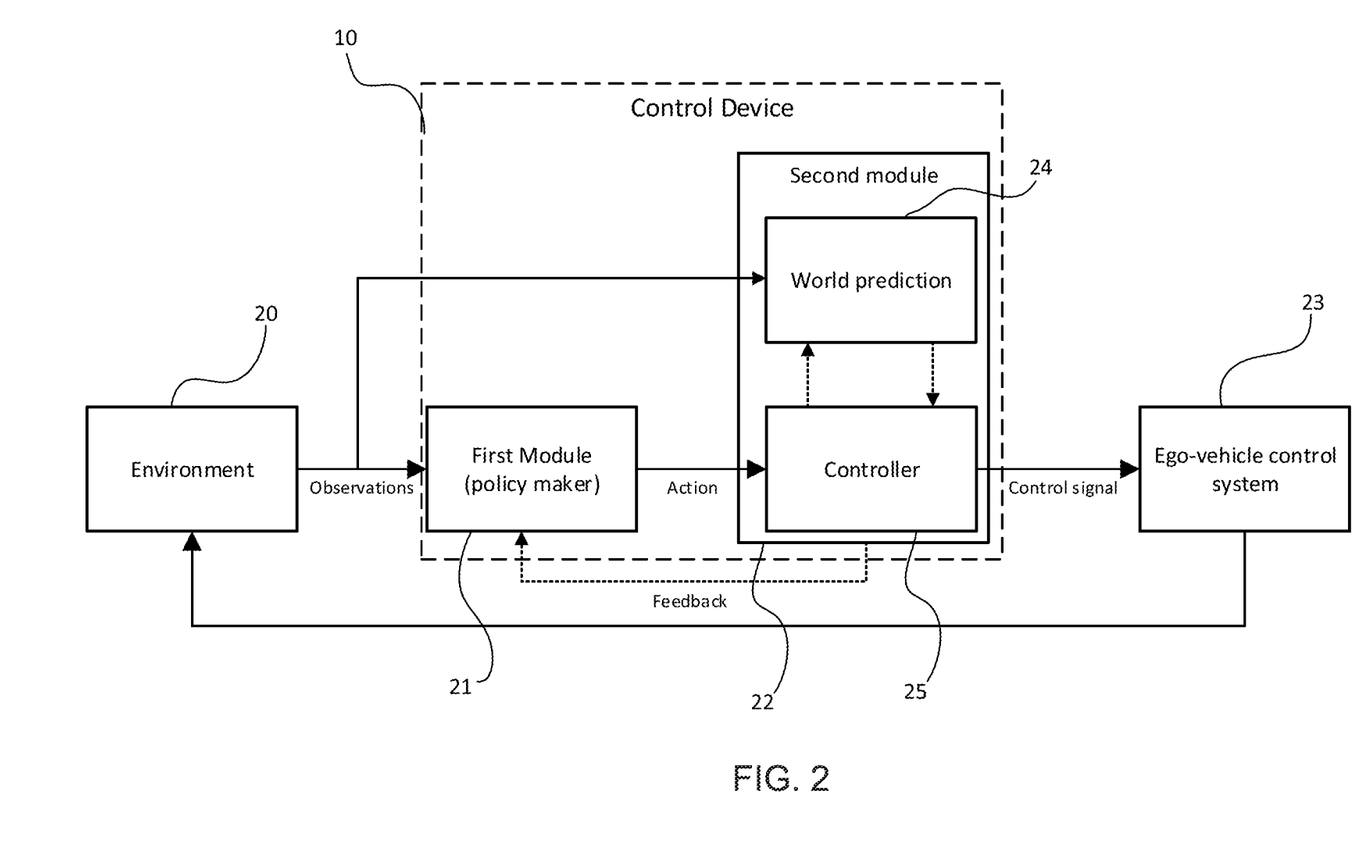
FIG. 2 is a schematic block diagram representation of a control device for generating manoeuvring decisions for an ego-vehicle in a traffic scenario in accordance with an embodiment of the present disclosure.

Moving on, FIG. 2 is a block diagram representation of a control device 10 device for generating manoeuvring decisions for an ego-vehicle in a traffic scenario. FIG. 2 serves to elucidate the flow of information to and from the modules 21, 22 of the control device 10. The general working principles of the control device 10 has already been discussed in the foregoing with respect to FIG. 1, and will for the sake of brevity and conciseness not be repeated in explicit detail. Instead, it is assumed that the skilled reader readily realizes how to apply the foregoing discussion to the illustration of FIG. 2.

In short, the control device 10 comprises a first module 21 and a second module 22, the first module being arranged as a policy maker and the second module being arranged as a controller. The first module is arranged to receive observations from the environment 20 and to generate an action based on the received observations by means of a trained self-learning model (such as a trained machine learning algorithm). In other words, the first module 21 has a self-learning model which is trained to identify a current traffic scenario and to generate a suitable action to solve a "problem" associated with the traffic scenario (e.g. lane merger, lane change, crossing an intersection, etc.). The second module 24 also receives environmental observations in order to predict a future environmental state (e.g. predict trajectories of the ego-vehicle and surrounding vehicles), and to generate a suitable trajectory for the vehicle given the determined action. The first module and second module are configured to receive observations from the environment (i.e. data comprising information about the surrounding environment) at each sampling instant. Thus, the second module 22 is here illustrated in the form of a model predictive controller (MPC) having two submodules, a world prediction module 24 that receives environmental observations and computes predictions of a future environmental state for a finite time horizon, and a controller module 25 which computes the most optimal trajectory to execute the received action. As mentioned, the first module 21 takes the high-level decisions based on what the self-learning model has "learned" during training, while the MPC 22 solves the low-level problem of generating a suitable trajectory. Using the two modules 21, 22 provides a synergistic effect in that each module 21, 22 compensates for at least some of the drawbacks of the other module 21, 22. For example, merely using a MPC 22 to solve the whole task, would for complex problems (e.g. scenarios where there is a plurality of surrounding vehicles to account for) become computationally intractable. Similarly, only using the first module with the self-learning module may result in an uncomfortable ride for vehicle passengers due to the self-learning model being able to freely determine new actions and trajectories while e.g. traversing through an intersection. The prediction process of the world prediction module 24 is exemplified with respect to FIG. 4.

Model predictive controllers (MPCs) rely on dynamic models of a process (surrounding vehicle behaviour), generally linear empirical models obtained by system identification. An advantage of MPC is the fact that it allows a current timeslot (i.e. time period) to be optimized, while keeping future timeslots (i.e. time periods) in account. This is achieved by optimizing over a finite time-horizon, but only implementing the current time period and then optimizing again, repeatedly. Also MPC has the ability to anticipate future events and can take control actions accordingly. MPC is most often implemented as a digital control; however, it can be implemented with specially designed analog circuitry.

Moving on, in accordance with an exemplary embodiment, the second module 22 may further be configured to compare the predicted environmental state with the received information about the surrounding environment of the ego-vehicle during the first time period. This comparison may for example be done in order to determine if the determined action is still feasible based on at least one predefined criteria. Accordingly, the second module 22 sends the signal in order to control the ego-vehicle according to the determined trajectory during the first time period while the determined action is feasible based on the at least one predefined criteria. However, the second module 22 is configured to send a second signal to the first module, the second signal comprising information about the comparison between the predicted environmental state and the received information about the surrounding environment of the ego-vehicle. Thus, the control signal may be referred to as a "first signal" and the feedback signal can be understood as a "second signal".

In more detail, the second module is configured to continuously reassess if the predicted environmental states correlates with the perceived "current" environmental state during the first time period, and to provide a feedback based on this assessment to the first module 21. The first module 21 is configured to receive this feedback signal and run it through the self-learning model in order to evaluate if a new action is to be generated or if the previously determined action still is feasible. The first module 21 also receives data comprising information about the surrounding environment during the first time period, in order to evaluate if a new action is to be generated or if the previously determined action still is feasible. The feedback accordingly acts an additional input to the trained self-learning model to generate actions for the ego-vehicle. For example, the trained self-learning model learned that in this specific environmental state (based on the received data), with a feedback signal indicating that the "confidence level" of the prediction made by the second module 22 is low, the previously determined action is still feasible and will therefore allow the second module to keep providing a control signal to the ego-vehicle based on the previously determined action. Thus, the first module 21 can compensate for model errors of the second module 22, and avoid unnecessary stops or jerking due to constant generation of new actions.

Moving on, as mentioned, the second module 22 can be configured to compare the predicted environmental state with the received information about the surrounding environment of the ego-vehicle during the first time period in order to determine/compute if the received action is feasible based on at least one predefined criteria. The wording that an action is feasible is to be understood as that a determined trajectory can be executed given the constraints defined by the one or more predefined criteria. In more detail, the predefined criteria may for example be one or more of the following: to execute the determined trajectory without collisions with other vehicles, without exceeding predefined acceleration thresholds, without exceeding predefined time thresholds, without breaking any predefined traffic rules, and so forth. A predefined passenger comfort model comprising an acceleration/deceleration limit of e.g. 5 m/s2 may define the acceleration thresholds.

The present inventors realized that by separating the decision policy (first module 21) from the control (second module 22), one can provide a computationally efficient and comfortable solution for autonomously manoeuvring an ego-vehicle in hard-to-predict traffic scenarios (such as intersections, especially intersections without traffic signs or traffic lights). In other words, the high-level decision making (i.e. the decision of when to drive) is separated from the low-level control (which handles the comfort of passengers in the ego-vehicle 1 by generating a smooth acceleration profile) in order to compensate for the deficiencies of each independent module as will be further discussed in the following.

As previously mentioned the second module may be in the form of a model predictive controller (MPC). In other words, a controller capable of computing a plurality of trajectories for the finite time-horizon in a given traffic scenario. Stated differently, a conventional MPC would compute all possible trajectories in a given traffic scenario and then choose the most "optimal" one with respect to a predefined function. However, a working principle of the proposed control device 10 is that the first module 21 is configured to (indirectly) limit the otherwise immense computational requirements, by determining an action and providing this to the MPC 22, which drastically limits the number of trajectories that are applicable. Thus, by utilizing a combination of a first module 21 having a trained self-learning model with a model predictive controller 22, advantages in terms of reliability, passenger comfort and computational efficiency are achievable.

In more detail, if one would only use an MPC 22 to solve the problem (i.e. manoeuvre through the intersection(s)), the computational time required to compute all possible actions and trajectories would exceed any reasonable limit for a practical implementation. The self-learning model of the first module 21 aids the MPC 22 by solving the mixed integer problem and by implicitly approximating which action is the optimal one so that the MPC 22 only needs to compute a prediction for a single action. Furthermore, the self-learning model of the first module 21 can compensate for model error in the MPC by optimizing the expected future reward based on the entire episode. For example, in some scenarios, the MPC may erroneously predict a collision, however, by means of the proposed solution; the first module can choose to continue with the current action anyway based on previous experience.

Figure 3:
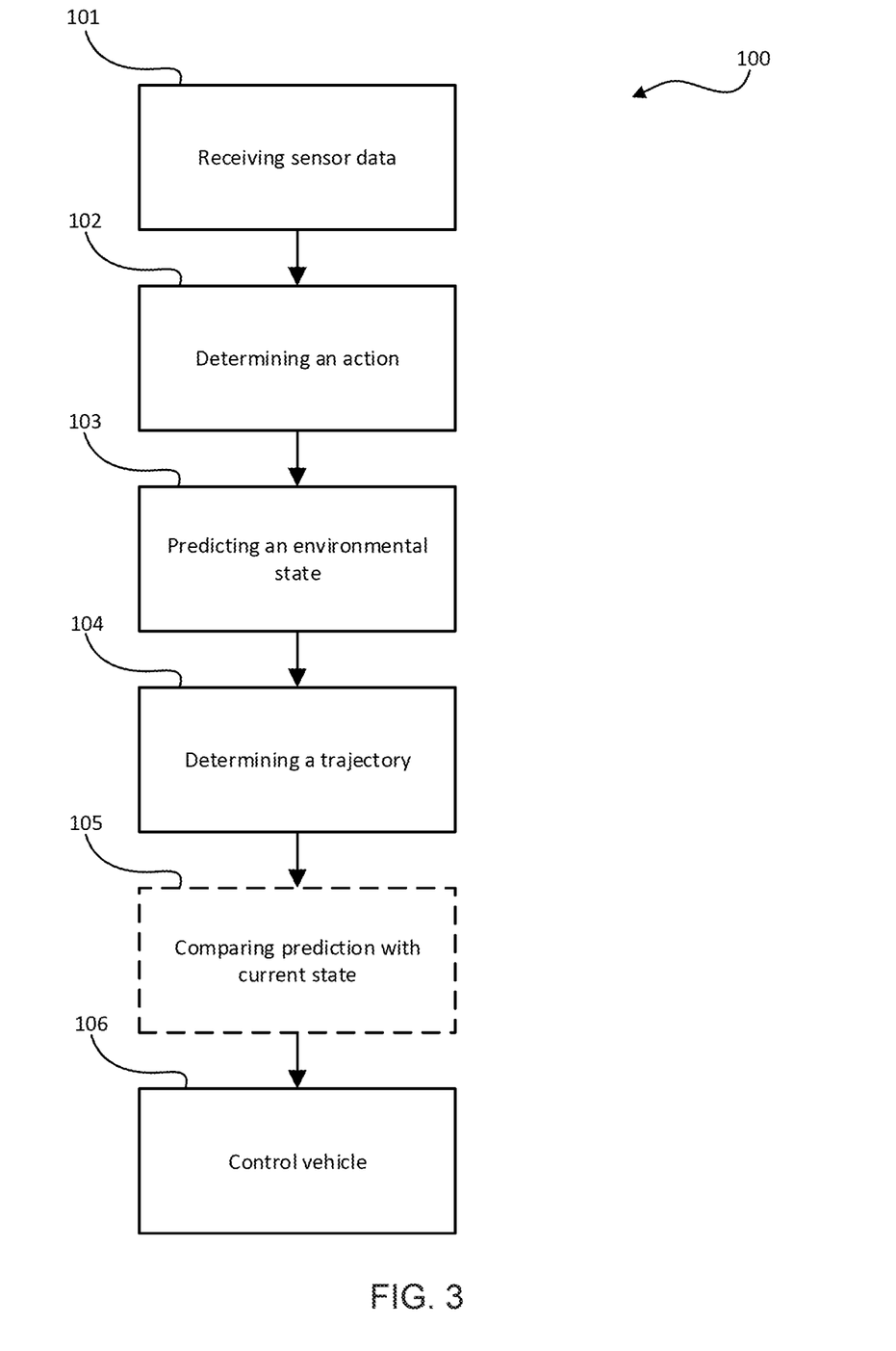
FIG. 3 is a schematic flow chart representation of a method for generating manoeuvring decisions for an ego-vehicle in a traffic scenario in accordance with an embodiment of the present invention.

FIG. 3 is a flow chart representation of a method 100 for generating manoeuvring decisions for an ego-vehicle in a traffic scenario associated with a plurality of possible trajectories for the ego-vehicle over a finite time horizon. The method 100 comprises receiving 101 data comprising information about a surrounding environment of the ego-vehicle, determining 102, by means of a trained self-learning model (e.g. a trained reinforcement learning algorithm), an action to be executed by the ego-vehicle based on the received data.

Further, the method comprises receiving the determined action, receiving data comprising information about the surrounding environment of the ego-vehicle during the finite time horizon, and predicting 103 an environmental state for a first time period of the finite time horizon. Next, a trajectory for the ego-vehicle is determined 104 based on the received action for the finite time horizon and on the predicted 103 environmental state for the first time period, and a signal is sent 106 in order to control the ego-vehicle according to the determined trajectory during the first time period.

Further, the method 100 may comprise a step of comparing 105 the predicted environmental state with the received information about the surrounding environment of the ego-vehicle during the first time period in order to determine if the determined action is feasible based on at least one predefined criteria. Accordingly, the sending 106 of the signal in order to control the ego-vehicle according to the determined trajectory during the first time period is done while the determined action is feasible based on the at least one predefined criteria. Moreover, the method may comprise a feedback step, i.e. sending a second signal to the trained self-learning model, the second signal comprising information about the comparison between the predicted environmental state and the received information about the surrounding environment of the ego-vehicle.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Naturally, a full decision architecture system would include other precautionary safety layers that will limit the system and limit the acceleration values that can be actuated in order to stay safe. For example, the acceleration request (control signal) from the second module may be sent through a collision avoidance system that checks if the current path has a collision risk, and mitigate if needed.

Figure 4:
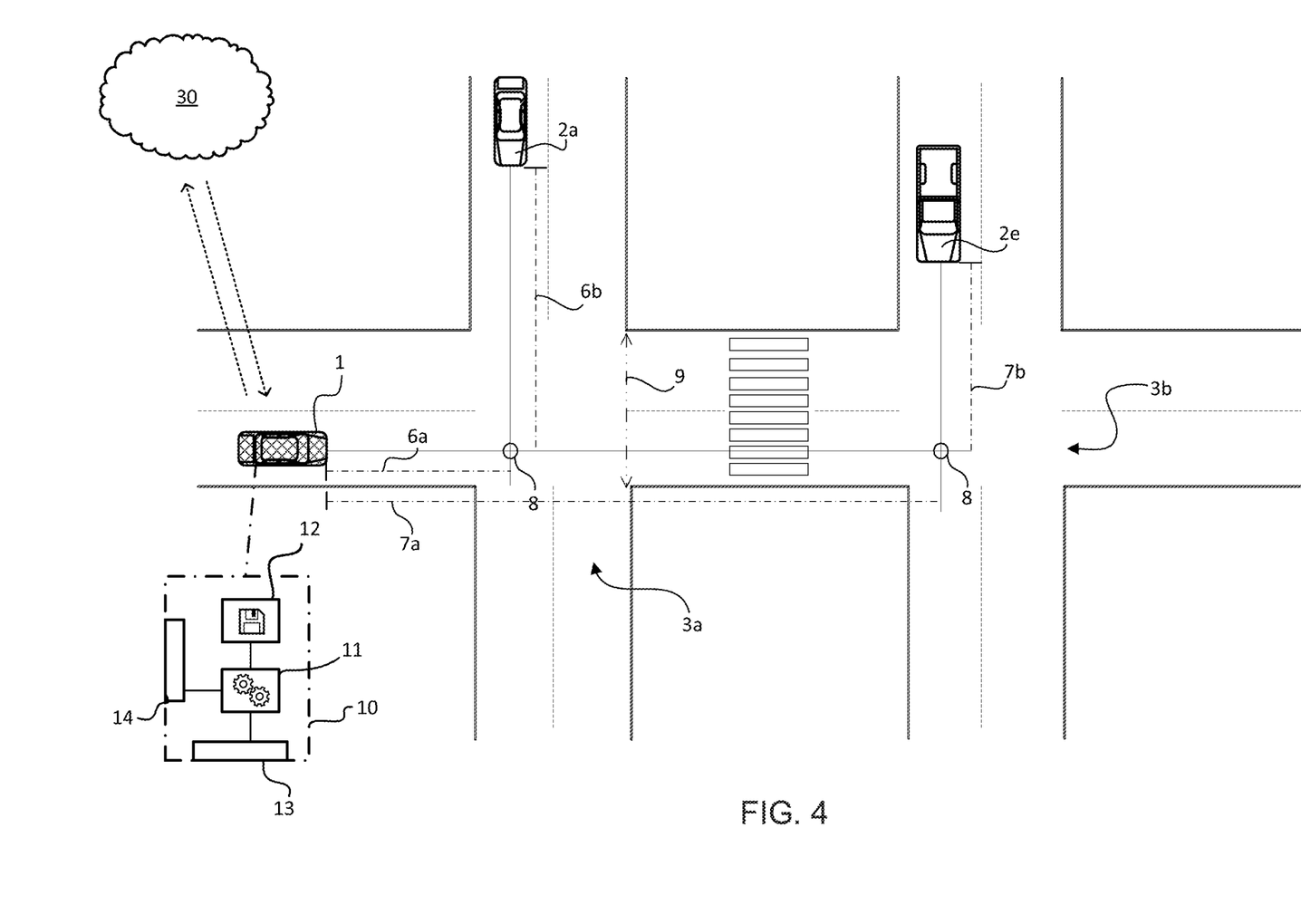
FIG. 4 is a schematic top view illustration of an ego-vehicle in a traffic scenario in accordance with an embodiment of the present disclosure.

FIG. 4 is a schematic top view illustration of an ego-vehicle in a traffic scenario in accordance with an embodiment of the present disclosure. In order for the control device 10 to be able to properly avoid collisions, it is necessary to provide information about the surrounding vehicles in the environment. The prediction layer (ref. 24 in FIG. 2) of the second module generates future motions of other vehicles 2a, 2e in the environment. For simplicity, one can assume a constant velocity prediction model. The motion is predicted at every time instant for prediction times $k \in [0,N]$, and can be used to form the collision avoidance constraints. As the skilled reader readily understands, there are other more or less complex prediction methods, however, the following simplified model is used to show the overall potential of the proposed solution.

A target obstacle j (i.e. a surrounding vehicle 2a, 2e) can be denoted as $x^j := [p^j, v^j, a^j]^T$, and an associated crossing point 8 at position $p^{cross,j}$ (ref. 6b, 7b in FIG. 4) in its own vehicle frame, which translated into the ego-vehicle 1 frame is denoted as $p_{ego}^{cross,j}$ (ref. 6a, 7a in FIG. 4). For each obstacle j the position along the driving path in an absolute frame is denoted as $p^j$, the velocity as $v^j$, and the acceleration as $a^j$. With a predefined road topology one can assume that the vehicles will travel along the assigned paths, and that collisions may only occur at the cross points 8 ($p^{cross,j}$) between a surrounding vehicle 2a, 2e and the ego-vehicle 1. Hence, for collision avoidance one can use the predictions of the future obstacle states $\bar{x}_k^j$ for times $k \in [0, N]$, provided by the world prediction layer (ref. 24 in FIG. 2). Given the obstacle state measurements, the prediction layer will generate future states throughout the prediction horizon. With this information, it is then possible to identify the time slots when a surrounding vehicle 2a, 2e will enter the intersection 3a, 3b.

Whenever an obstacle j is predicted to be within a threshold of $p^{cross,j}$, e.g. the width of the intersecting area 9, the ego-vehicle 1 faces a constraint of the following form $$\bar{p}_k^e \geq p_{ego}^{cross,j} + \Delta, \underline{p}_k^e \leq p_{ego}^{cross,j} + \Delta \qquad (3)$$

where $\Delta$ is selected to ensure sufficient padding from the crossing point 8 in order to avoid a collision.

Since the constraints from the surrounding obstacles (e.g. surrounding vehicles 2a, 2e) become non-convex the control devices 10 relies on the high-level policy maker (i.e. the first module) to decide through an action how to construct the constraints (eq. 3) for the control problem (solved by the second module). For instance, a take-way action implies that that the ego-vehicle 1 drives first through an intersection 3a, 3b, i.e. it needs to pass the intersection before all other vehicles. This implies that for any vehicle j that reaches the intersection during times k, the generated constraint needs to lower bound the state $p_k$ according to $$\max_j \; p^{cross,j} + \Delta \leq p_k^e \qquad (4)$$

Similarly, if the action is to give way, then the position needs to be upper bounded by the closest intersection point so that $$p_k^e \leq \min_j \; p_{ego}^{cross,j} - \Delta, \qquad (5)$$

for all times k that the obstacle is predicted to be in the intersection.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 4 in the vehicle. The communication/antenna interface 14 may further provide the possibility to send output to a remote location (e.g. remote operator or control centre) by means of the antenna 5. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs all or parts of the steps to determine the action, predict an environmental state, comparing the predicted environmental state with the received sensor data, and so forth. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving signals comprising information about a movement and information about a current road scenario may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A control device for generating maneuvering decisions for an ego-vehicle in a traffic scenario, the control device comprising:
    a first circuit comprising a trained self-learning model, the first circuit being configured to:
        receive data comprising information about a surrounding environment of the ego-vehicle;
        determine, by means of the trained self-learning model, an action to be executed by the ego-vehicle based on the received data, the determined action corresponding to a driving maneuver to be executed by the ego-vehicle; and
    a second circuit configured to:
        receive the determined action from the first circuit;
        receive data comprising information about the surrounding environment of the ego-vehicle during a finite time horizon;
        predict an environmental state for a first time period of the finite time horizon;
        determine a trajectory for the ego-vehicle based on the received action for the finite time horizon and on the predicted environmental state for the first time period; and
        send a signal in order to control the ego-vehicle according to the determined trajectory during the first time period,
    wherein the second circuit is further configured to:
        compare the predicted environmental state with the received information about the surrounding environment of the ego-vehicle during the first time period in order to determine if the determined action is feasible based on at least one predefined criteria;
send the signal in order to control the ego-vehicle according to the determined trajectory during the first time period while the determined action is feasible based on the at least one predefined criteria; and
send a second signal to the first circuit, the second signal comprising information about the comparison between the predicted environmental state and the received information about the surrounding environment of the ego-vehicle, and wherein the first circuit is configured to:
receive the second signal transmitted by the second circuit; and
determine, by means of the trained self-learning model, the action to be executed by the ego-vehicle further based on the received second signal.

2. The control device according to claim 1, wherein the surrounding environment of the ego-vehicle comprises a plurality of surrounding vehicles.

3. The control device according to claim 1, wherein the information about the surrounding environment comprises a current state of the ego-vehicle and a current state of any surrounding vehicles relative to a reference point.

4. The control device according to claim 1, wherein the predicted environmental state comprises a predicted state of the ego-vehicle and a predicted state of any surrounding vehicles relative to the ego-vehicle.

5. The control device according to claim 1, wherein the second circuit comprises a model predictive controller.

6. The control device according to claim 1, wherein the trained self-learning model comprises a trained artificial neural network.

7. The control device according to claim 1, wherein the traffic scenario comprises at least one intersection, and wherein the received data comprises a number of surrounding vehicles, a number of intersections, a position of an ego-vehicle, a position of each surrounding vehicle, a velocity of each surrounding vehicle, an acceleration of each surrounding vehicle, a dimension of each surrounding vehicle, a distance between each surrounding vehicle and a reference point in the surrounding environment, a distance between the ego-vehicle and the reference point in the surrounding environment, and a dimension of each intersection.

8. The control device according to claim 7, wherein the trained self-learning model is trained such that the determined action comprises crossing the at least one intersection by passing in front of or behind a surrounding vehicle in the surrounding environment, and wherein the second circuit is configured to determine a trajectory for the ego-vehicle to execute the determined action, wherein the determined trajectory is optimized with respect to a predefined function.

9. The control device according to claim 2, wherein the predefined criteria comprises at least one of an acceleration threshold, distance threshold, and a time threshold.

10. A vehicle comprising:
a perception system comprising at least one sensor configured to obtain information about a surrounding environment of the vehicle; and
a control device for generating maneuvering decisions for an ego-vehicle in a traffic scenario, the control device comprising:
a first circuit comprising a trained self-learning model, the first circuit being configured to:
receive data comprising information about a surrounding environment of the ego-vehicle;
determine, by means of the trained self-learning model, an action to be executed by the ego-vehicle based on the received data, the determined action corresponding to a driving maneuver to be executed by the ego-vehicle; and
a second circuit configured to:
receive the determined action from the first circuit;
receive data comprising information about the surrounding environment of the ego-vehicle during a finite time horizon;
predict an environmental state for a first time period of the finite time horizon;
determine a trajectory for the ego-vehicle based on the received action for the finite time horizon and on the predicted environmental state for the first time period; and
send a signal in order to control the ego-vehicle according to the determined trajectory during the first time period,
wherein the second circuit is further configured to:
compare the predicted environmental state with the received information about the surrounding environment of the ego-vehicle during the first time period in order to determine if the determined action is feasible based on at least one predefined criteria;
send the signal in order to control the ego-vehicle according to the determined trajectory during the first time period while the determined action is feasible based on the at least one predefined criteria; and
send a second signal to the first circuit, the second signal comprising information about the comparison between the predicted environmental state and the received information about the surrounding environment of the ego-vehicle, and
wherein the first circuit is configured to:
receive the second signal transmitted by the second circuit; and
determine, by means of the trained self-learning model, the action to be executed by the ego-vehicle further based on the received second signal.

11. A method for generating maneuvering decisions for an ego-vehicle in a traffic scenario, the method comprising:
receiving, by a first circuit comprising a trained self-learning model, data comprising information about a surrounding environment of the ego-vehicle;
determining, by the first circuit comprising the trained self-learning model, an action to be executed by the ego-vehicle based on the received data, the determined action corresponding to a driving maneuver to be executed by the ego-vehicle; and
receiving, by a second circuit, the determined action from the first circuit;
receiving, by the second circuit, data comprising information about the surrounding environment of the ego-vehicle during a finite time horizon;
predicting, by the second circuit, an environmental state for a first time period of the finite time horizon;
determining, by the second circuit, a trajectory for the ego-vehicle based on the received action for the finite time horizon and on the predicted environmental state for the first time period; and
sending, by the second circuit, a signal in order to control the ego-vehicle according to the determined trajectory during the first time period,
comparing, by the second circuit, the predicted environmental state with the received information about the surrounding environment of the ego-vehicle during the first time period in order to determine if the determined action is feasible based on at least one predefined criteria;

sending, by the second circuit, the signal in order to control the ego-vehicle according to the determined trajectory during the first time period while the determined action is feasible based on the at least one predefined criteria; and sending, by the second circuit, a second signal to the first circuit, the second signal comprising information about the comparison between the predicted environmental state and the received information about the surrounding environment of the ego-vehicle, and receiving, by the first circuit, the second signal transmitted by the second circuit; and determining, by means of the trained self-learning model, the action to be executed by the ego-vehicle further based on the received second signal.

12. A non-transitory computer-readable storage medium storing one or more programs configured to be executed by one or more processors of a vehicle control system, the one or more programs comprising instructions for performing the method, the method comprising:

receiving, by a first circuit comprising a trained self-learning model, data comprising information about a surrounding environment of the ego-vehicle;

determining, by the first circuit comprising the trained self-learning model, an action to be executed by the ego-vehicle based on the received data, the determined action corresponding to a driving maneuver to be executed by the ego-vehicle; and receiving, by a second circuit, the determined action from the first circuit;

receiving, by the second circuit, data comprising information about the surrounding environment of the ego-vehicle during a finite time horizon;

predicting, by the second circuit, an environmental state for a first time period of the finite time horizon;

determining, by the second circuit, a trajectory for the ego-vehicle based on the received action for the finite time horizon and on the predicted environmental state for the first time period; and sending, by the second circuit, a signal in order to control the ego-vehicle according to the determined trajectory during the first time period, comparing, by the second circuit, the predicted environmental state with the received information about the surrounding environment of the ego-vehicle during the first time period in order to determine if the determined action is feasible based on at least one predefined criteria;

sending, by the second circuit, the signal in order to control the ego-vehicle according to the determined trajectory during the first time period while the determined action is feasible based on the at least one predefined criteria;

sending, by the second circuit, a second signal to the first circuit, the second signal comprising information about the comparison between the predicted environmental state and the received information about the surrounding environment of the ego-vehicle, and receiving, by the first circuit, the second signal transmitted by the second circuit; and determining, by means of the trained self-learning model, the action to be executed by the ego-vehicle further based on the received second signal.

* * * * *